US012692118B2

(12) United States Patent
Ogata et al.

(10) Patent No.: US 12,692,118 B2
(45) **Date of Patent: *Jul. 28, 2026**

(54) SHEET CHARACTERISTIC DETECTION DEVICE AND IMAGE FORMING SYSTEM

(71) Applicant: Konica Minolta, Inc., Tokyo (JP)

(72) Inventors: Satoshi Ogata, Hachioji (JP); Hitoshi Asano, Toyokawa (JP); Yumiko Izumiya, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 18/591,658

(22) Filed: Feb. 29, 2024

(65) Prior Publication Data

US 2024/0308801 A1 Sep. 19, 2024

(30) Foreign Application Priority Data

Mar. 13, 2023 (JP) ................................ 2023-038349

(51) Int. Cl.

| | |
|---|---|
| ***B65H 29/62*** | (2006.01) |
| ***B65H 43/04*** | (2006.01) |
| ***G03G 15/00*** | (2006.01) |

(52) U.S. Cl.

CPC ............ *B65H 29/62* (2013.01); *B65H 43/04* (2013.01); *G03G 15/5029* (2013.01); *G03G 15/6552* (2013.01); *G03G 15/6558* (2013.01); *B65H 2511/13* (2013.01); *B65H 2515/805* (2013.01); *B65H 2515/81* (2013.01); *B65H 2553/40* (2013.01); *B65H 2701/1131* (2013.01); *G03G 2215/0062* (2013.01); *G03G 2215/00717* (2013.01); *G03G 2215/00734* (2013.01); *G03G 2215/00738* (2013.01); *G03G 2215/00742* (2013.01); *G03G 2215/00751* (2013.01); *G03G 2215/00776* (2013.01)

(58) Field of Classification Search

CPC ........... B65H 29/62; B65H 43/04; B65H 7/06

See application file for complete search history.

(56) References Cited

U.S. PATENT DOCUMENTS

| | | | |
|---|---|---|---|
| 7,062,214 B2 * | 6/2006 | Moriyama | G03G 15/655 399/382 |
| 10,321,001 B2 * | 6/2019 | Mizuno | H04N 1/00864 |

(Continued)

FOREIGN PATENT DOCUMENTS

| | | |
|---|---|---|
| CN | 115576175 A | 1/2023 |
| JP | 2020-008621 | 1/2020 |
| JP | 2020-128269 | 8/2020 |

OTHER PUBLICATIONS

European Patent Application No. 24157988.7; Extended Search Report; dated Aug. 2, 2024; 8 pages.

*Primary Examiner* — Jeremy R Severson
(74) *Attorney, Agent, or Firm* — BakerHostetler

(57) ABSTRACT

A sheet characteristic detection device includes a first conveyance path on which a sheet is conveyed, a second conveyance path that is branched from the first conveyance path and on which a sheet to be purged is conveyed without passing through an image former, and a first detector that is disposed on the first conveyance path and allows detection of sheet characteristic information corresponding to at least one of a size, a sheet thickness, a basis weight, or a moisture amount of the sheet.

22 Claims, 11 Drawing Sheets

(56) References Cited

U.S. PATENT DOCUMENTS

| | | | | |
|---|---|---|---|---|
| 10,684,218 | B2 * | 6/2020 | Ishimoto | G01N 21/3559 |
| 12,145,819 | B2 * | 11/2024 | Matsui | B65H 85/00 |
| 12,479,218 | B2 * | 11/2025 | Fukunaga | B41J 11/42 |

* cited by examiner

FIG. 14

| | FIRST DETECTOR | | | | SECOND DETECTOR | | |
|---|---|---|---|---|---|---|---|
| TYPE OF SENSOR | SENSOR 1 | SENSOR 2 | SENSOR 3 | SENSOR 4 | SENSOR 5 | SENSOR 6 | SENSOR 7 |
| | SIZE | SHEET THICKNESS | BASIS WEIGHT | MOISTURE PERCENTAGE | STIFFNESS | SURFACE PROPERTY | SHEET RESISTANCE |
| SHEET CHARACTERISTIC | SHEET CHARACTERISTIC 1 (SIZE) | SHEET CHARACTERISTIC 2 (THICKNESS) | SHEET CHARACTERISTIC 3 (BASIS WEIGHT) | SHEET CHARACTERISTIC 4 (WATER CONTENT) | SHEET CHARACTERISTIC 5 (BENDING STRENGTH) | SHEET CHARACTERISTIC 6 (SMOOTHNESS) | SHEET CHARACTERISTIC 7 (VOLUME RESISTANCE VALUE) |
| ADOPTED TECHNIQUE | OPTICAL | MECHANICAL DISPLACEMENT AMOUNT | OPTICAL TRANSMITTANCE AND REFLECTION | OPTICAL TRANSMITTANCE (ABSORPTION OF OH GROUP) | MECHANICAL DISPLACEMENT AMOUNT | OPTICAL SPECULAR REFLECTION AND DIFFUSE REFLECTION | ELECTRIC CURRENT |
| FIXING QUALITY | — | ○ | ○ | ○ | ○ | ○ | — |
| SECONDARY TRANSFER QUALITY | — | ○ | ○ | ○ | ○ | ○ | ○ |
| CONVEYANCE QUALITY | — | ○ | ○ | — | ○ | ○ | — |
| SHEET EJECTION QUALITY | — | ○ | ○ | — | ○ | ○ | — |

SHEET CHARACTERISTIC DETECTION DEVICE AND IMAGE FORMING SYSTEM

CROSS-REFERENCE TO RELATED APPLICATION

This application claims priority to Japanese patent application No. 2023-038349, filed on Mar. 13, 2023, which is incorporated herein by reference in its entirety.

BACKGROUND OF THE INVENTION

Technical Field

The present invention relates to a sheet characteristic detection device and an image forming system.

Description of Related Art

In recent years, an image forming apparatus such as a printer of an electrophotographic method has been widely used in the color printing industry. In the field of production printing (PP) corresponding to the color printing industry, there is a demand for adaptation to various types of sheets as compared with a case of being used in an office. In order to perform high-quality printing on these various types of sheets, there is an image forming apparatus that sets characteristics of sheets stored on a sheet feed tray with a plurality of items and performs printing under image formation conditions corresponding to the set items.

In order to perform such various sheet settings, for example, a configuration has been proposed in which a detector for detecting characteristics such as a type and a physical property value of a sheet (hereinafter, sheet characteristics) is disposed on a sheet conveyance path (for example, Japanese Unexamined Application Patent Publication No. 2020-128269). In addition, a configuration has been proposed in which, when a sheet characteristic detected by a detector is different from a setting, the sheet is ejected from the image forming apparatus without being subjected to image formation (for example, Japanese Unexamined Patent Application Publication No. 2020-008621).

SUMMARY OF THE INVENTION

In the image forming apparatus described above, the sheet whose sheet characteristic has been detected is ejected after being passed through an image former. However, when a sheet (inappropriate sheet) having characteristics (size, charging, folding, thickness, stiffness, moisture percentage, and the like) inappropriate for image formation is passed through the image former, there is a possibility the reliability of image formation is degraded. For example, when a sheet deformed due to folding or the like is conveyed, a conveyance failure such as a sheet jam (so-called jam) is likely to occur, and conveyance reliability at the time of image formation is degraded. Furthermore, a sheet having a size or type different from print job setting of a print job (hereinafter, referred to as inappropriate sheet) may be mixed in a bundle of sheets in a sheet feed tray. In such a case, since an image is formed under an image formation condition that is not adapted to the inappropriate sheet, a conveyance failure, a fixing failure, or the like is likely to occur, and the conveyance reliability at the time of image formation is degraded. For example, when an electrical resistance is measured as a sheet characteristic by the detector, the sheet may be charged. For example, when the sheet is paper that is an insulator, a surface electrical resistance is about $10^{10}\Omega$ to $10^{12}\Omega$, although the number of digits changes in accordance with humidity. In this case, a residual potential of the sheet is not discharged in a short time, the sheet sticks in the image former, and important movement of charges in an electrophotographic process is not correctly performed. Therefore, in the image former, the reliability of an image forming operation of image formation may be degraded.

The present invention has been made in consideration of the above circumstances, and provides a sheet conveyance apparatus and an image forming system that can suppress a degradation of reliability at a time of image formation.

To achieve at least one of the abovementioned objects, according to an aspect of the present invention, a device reflecting one aspect of the present inventions comprises the followings.

A sheet characteristic detection device including: a first conveyance path on which a sheet is conveyed; a second conveyance path that is branched from the first conveyance path and on which a sheet to be purged is conveyed without passing through an image former; and a first detector that is disposed on the first conveyance path and allows detection of sheet characteristic information corresponding to at least one of a size, a sheet thickness, a basis weight, or a moisture amount of the sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 14 is a diagram for describing a quality item in each process of image forming processing and a sheet characteristic related to each quality item.

DETAILED DESCRIPTION

Figure 1:
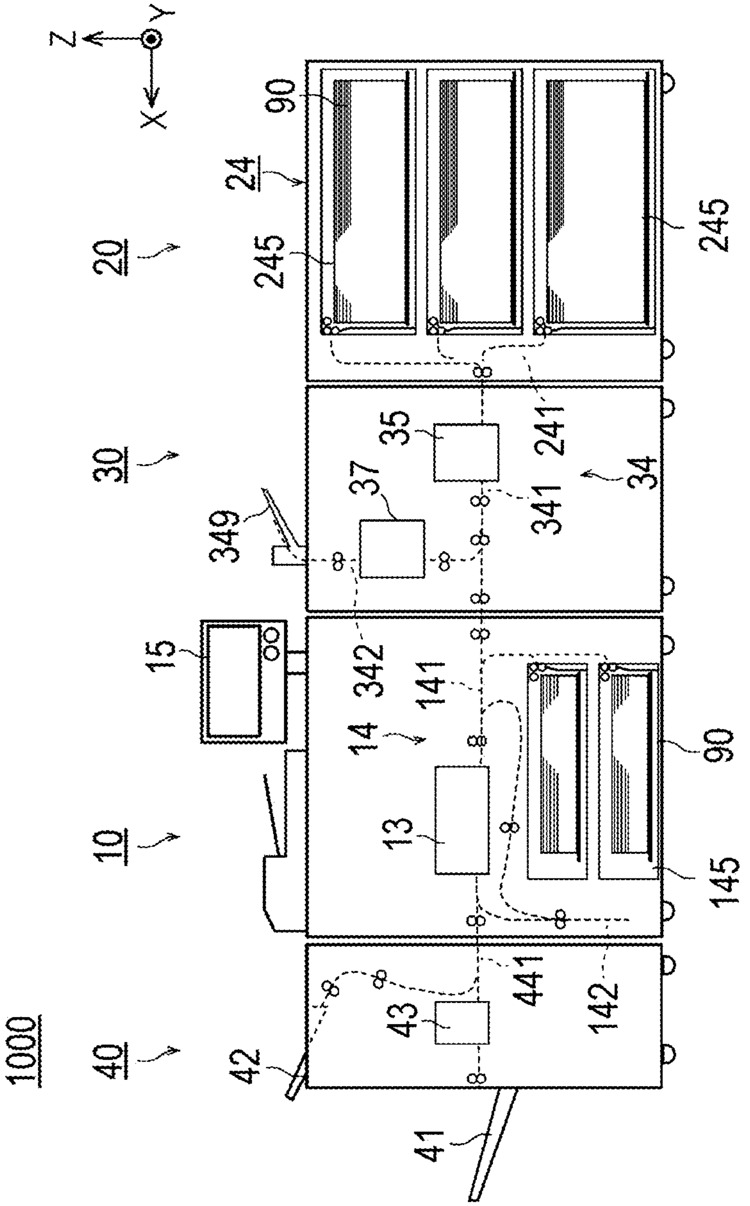
FIG. 1 is a diagram illustrating a schematic configuration of an image forming apparatus including a sheet characteristic detection device according to the present embodiment.

Embodiments of the present invention will be described hereinafter with reference to the attached drawings. However, the scope of the present invention is not limited to the disclosed embodiments. In the description of the drawings, the same elements are denoted by the same reference signs, and redundant description thereof will be omitted. In addition, dimensional ratios in the drawings are exaggerated for convenience of description and may be different from actual ratios. In the drawings, an up-down direction (vertical direction) is defined as a Z direction, a front direction and a rear direction of an image forming system or a sheet characteristic detection device are defined as a Y direction, and a direction orthogonal to the Y and Z directions is defined as an X direction. The X direction is also referred to as a conveyance direction of a sheet. The Y direction is also referred to as a width direction. In the present embodiment, the sheet includes a printing sheet (hereinafter simply referred to as sheet) and various films. In particular, the sheet includes a sheet produced by using mechanical pulp and/or chemical pulp derived from a plant. Examples of the types of sheets include a coated glossy paper, a matte paper, an uncoated plain paper, and a high-quality paper.

Figure 2:
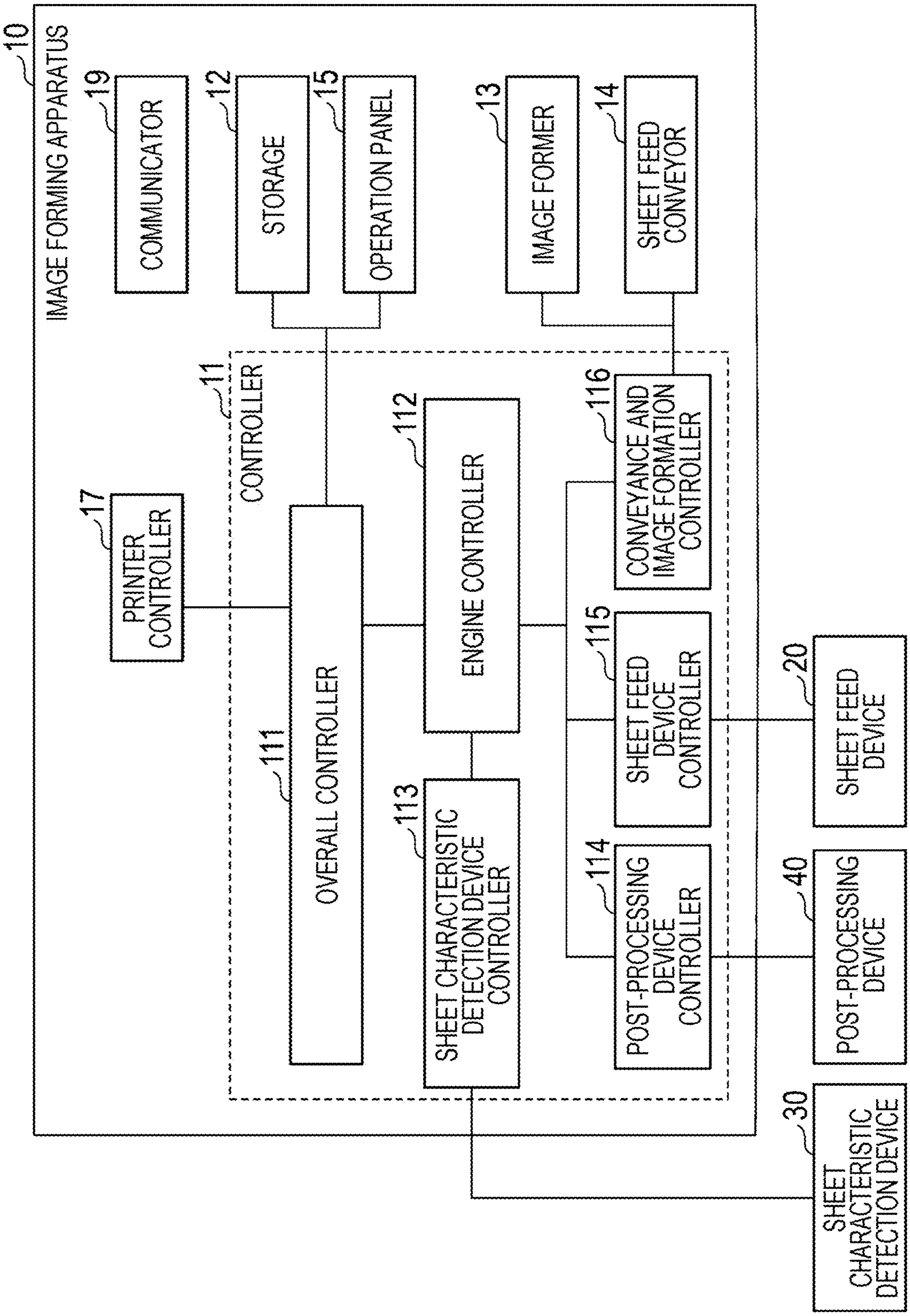
FIG. 2 is a block diagram of the image forming apparatus.

FIG. 1 is a diagram illustrating a schematic configuration of an image forming system 1000 including a sheet characteristic detection device 30 according to the present embodiment. FIG. 2 is a block diagram illustrating a hardware configuration of the image forming system 1000. As illustrated in FIG. 1, the image forming system 1000 includes an image forming apparatus 10, a sheet feed device 20, a sheet characteristic detection device 30, and a post-processing device 40, which are mechanically and electrically connected to each other.

(Image forming apparatus 10). The image forming apparatus 10 forms an image on a sheet 90 sent from the sheet characteristic detection device 30 on an upstream side. The image forming apparatus 10 includes a controller 11, a storage 12, an image former 13, a sheet feed conveyor 14, an operation panel 15, a printer controller 17, a communicator 19, and the like. These components are connected to each other via a signal line such as a bus for exchanging signals.

(Controller 11). The controller 11 includes a CPU, a ROM, a RAM, and the like. The controller 11 executes various kinds of processing by executing programs stored in the ROM and the storage 12 described later, and controls various parts of the apparatus and executes various kinds of calculation processing in accordance with the programs. The controller 11 functions as an overall controller 111, an engine controller 112, a sheet characteristic detection device controller 113, a post-processing device controller 114, a sheet feed device controller 115, and a conveyance and image formation controller 116. The functions of these sub-controllers 111 to 116 will be described later.

(Storage 12). The storage 12 includes a ROM that stores various programs and various types of data in advance, a RAM that temporarily stores programs and data as a work area, and an auxiliary storage such as a hard disk that stores various programs and various types of data. In addition, the storage 12 stores information of sheets stored in each sheet feed tray. The information of sheets includes information of a sheet brand, size (sheet width and sheet length), basis weight (weight), and sheet type (gloss coated paper, matte coated paper, plain paper, high-quality paper, rough paper, and the like). In addition, the storage 12 may store a sheet brand, a determination model (determination model algorithm) used for determining a control parameter, and a paper profile.

(Image former 13). The image former 13 forms an image by, for example, an electrophotographic method. The image former 13 includes a writer corresponding to each of basic colors of yellow (Y), magenta (M), cyan (C), and black (K), a photosensitive drum, and a developing device that accommodates a two-component developer including a toner of each color and a carrier. The image former 13 further includes an intermediate transfer belt, a secondary transferer, and a fixer. Toner images formed on the photosensitive drums by the developing devices of the respective colors are superimposed on the intermediate transfer belt, and are transferred onto the conveyed sheet 90 at the secondary transferer. The toner image on the sheet 90 is fixed on the sheet 90 by being heated and pressed by the fixer on a downstream side.

(Sheet feed conveyor 14). The sheet feed conveyor 14 includes conveyance paths 141 and 142, a plurality of sheet feed trays 145, and the like. The conveyance path 141 includes a plurality of conveyance roller pairs provided along the conveyance path and a drive motor (not illustrated) that drives the conveyance roller pairs. The sheet feed conveyor 14 includes a delivery roller that delivers an uppermost sheet of a plurality of sheets 90 loaded and placed in the sheet feed tray 145, and delivers the sheets 90 in the sheet feed tray to a conveyance path on the downstream side one by one. The first conveyance path 341 of the sheet characteristic detection device 30 is connected to the upstream side of the conveyance path 141.

The sheet feed conveyor 14 conveys the sheet 90 fed from the sheet feed tray 145 and the like. The sheet 90 conveyed on the conveyance path 141 is subjected to image formation by the image former 13, and then ejected onto a sheet ejection tray 41 via the subsequent post-processing device 40. In double-sided printing in which an image is also formed on a back surface of the sheet 90, the sheet 90 on which an image has been formed on one side is conveyed to the conveyance path 142 for double-sided image formation in a lower portion of the apparatus body. The sheet 90 conveyed to the conveyance path 142 has the front and back inverted on a switchback path and then merges with the conveyance path 141 for single-sided printing, and an image is again formed on the other surface of the sheet 90 by the image former 13.

(Operation panel 15 and the like). The operation panel 15 includes a touch screen, a numeric keypad, a start button, a stop button, and the like. The operation panel 15 displays a state of the image forming apparatus 10 or the image forming system 1000, and is used for input of settings and instructions from a user, as for the type of sheet placed in the sheet feed tray 145 or the like.

The printer controller 17 acquires a print job transmitted from a terminal device such as a personal computer (PC). Print data (image data) described in a page description language (PDL) format or a portable document format (PDF) included in the print job is rasterized by the printer controller 17 to be converted into image data for each page in a raster format, and is temporarily stored in a page memory. The image data from the page memory is read at a predetermined timing, stored in a buffer, and output as an exposure signal to a writer for each main scanning line in synchronization with a writing timing.

The communicator 19 is an interface for communicating with other devices.

(Sub-controllers 111 to 116). When a print job is input, the overall controller 111 causes the engine controller 112 to execute the print job based on print job setting information of the input print job. The print job is input in response to an instruction sent from the operation panel 15 or an external terminal such as a network-connected PC operated by the user.

The engine controller 112 performs processing related to image formation by controlling the post-processing device controller 114, the sheet feed device controller 115, and the conveyance and image formation controller 116. The post-processing device controller 114 controls the post-processing device 40. Specifically, the post-processing device controller 114 transmits, to the post-processing device 40, a sheet conveyance timing, setting information of post-processing of a sheet to be conveyed, and the like. The sheet feed device controller 115 controls the sheet feed device 20. Specifically, the sheet feed device controller 115 communicates with the sheet feed device 20 to transmit and receive the sheet feed tray to be used, the sheet conveyance timing, and the like.

The conveyance and image formation controller 116 controls sheet feed conveyance of the sheet 90 by controlling the sheet feed conveyor 14 (including drive motors for the conveyance paths 141 and 142, the fixer, and the like). The conveyance and image formation controller 116 also controls the image former 13 to control an image formation condition and an image formation timing according to a sheet position.

In response to an execution instruction request from the engine controller 112, the sheet characteristic detection device controller 113 controls the sheet characteristic detection device 30 to execute measurement of the sheet characteristic by various sensors included in the sheet characteristic detection device 30.

(Sheet feed device 20). As illustrated in FIG. 1, the sheet feed device 20 includes a sheet feed conveyor 24. The sheet feed conveyor 24 functions as a sheet feeder. In addition, the sheet feed device 20 includes a controller, a storage, and a communicator (none of which are illustrated) in addition to the sheet feed conveyor 24, and these components are connected to each other via a signal line such as a bus for exchanging signals. The sheet feed conveyor 24 includes a plurality of sheet feed trays 245 and a conveyance path 241. The conveyance path 241 is connected to the first conveyance path 341. The sheet 90 fed from each sheet feed tray 245 and conveyed on the conveyance path 241 is conveyed to the sheet characteristic detection device 30 on the downstream side, and the sheet characteristic is measured or an image is formed by the image forming apparatus 10 on the further downstream side.

(Post-processing device 40). The post-processing device 40 performs post-processing on the sheet 90 sent from the image forming apparatus 10 or ejects the sheet 90 in accordance with the setting of the printing job. The post-processing device 40 includes sheet ejection trays 41 and 42, a post-processor 43, and a conveyance path 441. In addition, the post-processing device 40 includes a controller, a storage, a conveyor, and a communicator (none of which are illustrated), and these components are connected to each other via a signal line such as a bus for exchanging signals. The sheet ejection trays 41 and 42 are selected in accordance with the setting of the print job. The conveyance path 441 is connected to the conveyance path 141 on the upstream side. The post-processor 43 performs at least one of stapling, punching, cutting, folding, or bookbinding on the sheet 90 on which an image has been formed.

Figure 3:
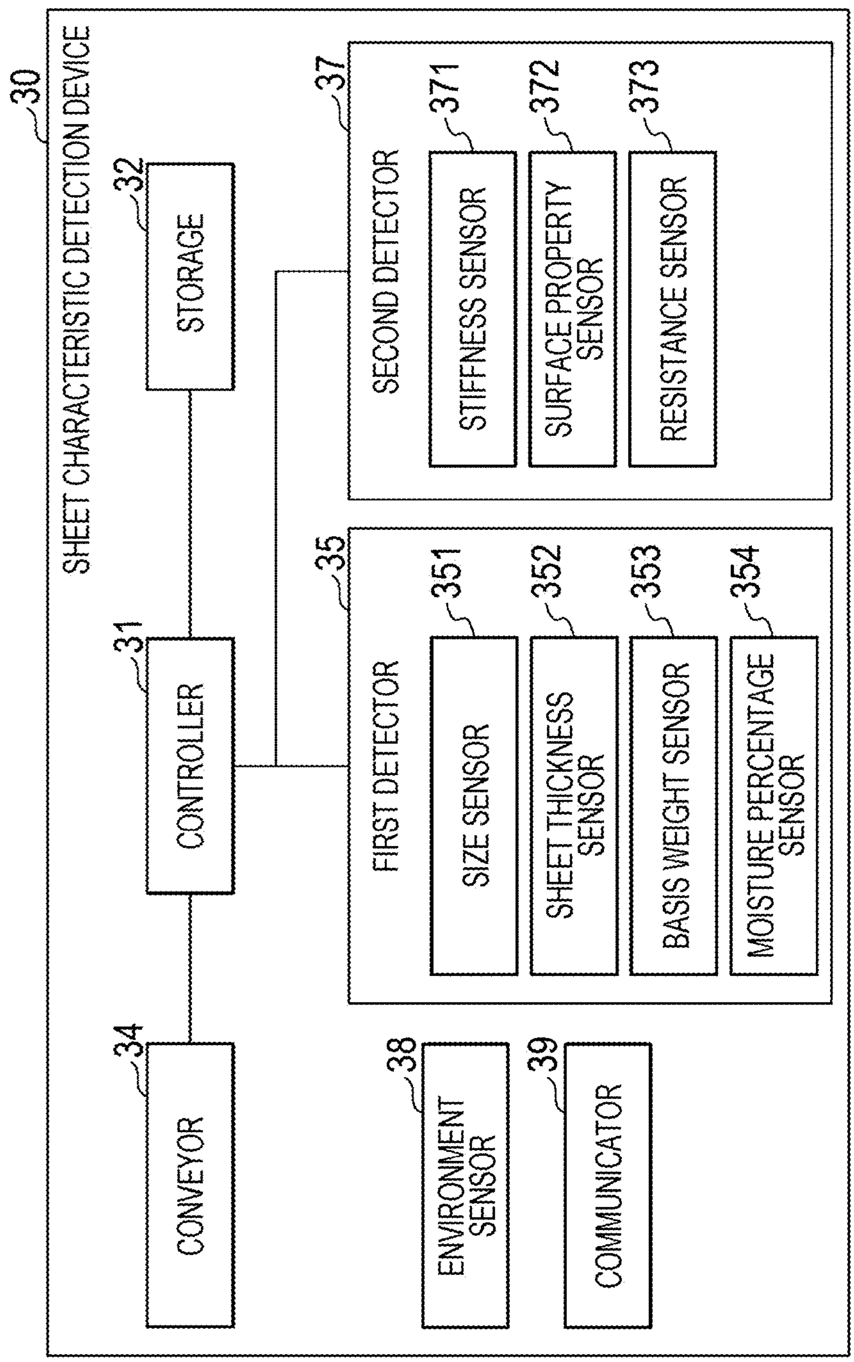
FIG. 3 is a block diagram of the sheet characteristic detection device.
Figure 4:
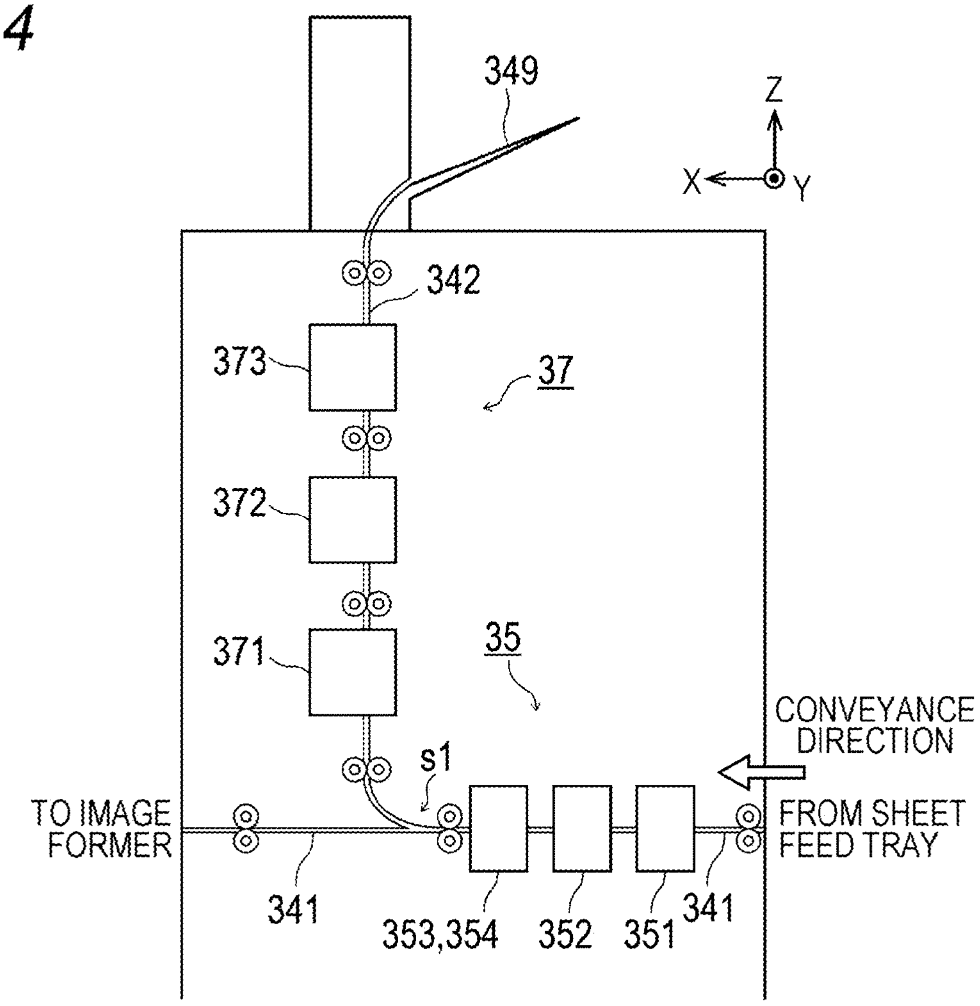
FIG. 4 is a diagram illustrating a schematic configuration of the sheet characteristic detection device.

(Sheet characteristic detection device 30). Next, the sheet characteristic detection device 30 will be described with reference to FIGS. 3 to 12. FIG. 3 is a block diagram of the sheet characteristic detection device 30, and FIG. 4 is a diagram illustrating a schematic configuration of the sheet characteristic detection device. The sheet characteristic detection device 30 includes a controller 31, a storage 32, a conveyor 34, a first detector 35, a second detector 37, an environment sensor 38, and a communicator 39. The environment sensor 38 detects at least one of temperature or humidity in the apparatus body. The communicator 39 is an interface for communicating with other devices.

The controller 31 includes a CPU and a memory, similarly to the controller 11 described above. The controller 31 controls the operation of the first detector 35 and the second detector 37 to detect sheet characteristic information corresponding to the sheet characteristic of the sheet 90.

The storage 32 includes a ROM that stores various programs and various types of data in advance, a RAM that temporarily stores programs and data as a work area, and an auxiliary storage such as a hard disk that stores various programs and various types of data. The storage 32 also stores an environment correction table in which detection values of the environment sensor 38 are associated with correction values. The controller 31 corrects a detection result of each sensor of the first detector 35 and the second detector 37 in accordance with the detection values of the environment sensor 38 and the environment correction table.

The conveyor 34 includes a first conveyance path 341, a second conveyance path 342, and a purge tray 349 for ejecting the sheet 90 to be purged. The first and second conveyance paths 341 and 342 include a plurality of conveyance roller pairs provided along the conveyance paths and drive motors (not illustrated) that drive the conveyance roller pairs. The first conveyance path 341 is a main conveyance path, and has an upstream side connected to the conveyance path 241 of the sheet feed device 20 and a downstream side connected to the conveyance path 141 of the image forming apparatus 10. The second conveyance path 342 is branched from the first conveyance path 341 at a branch portion s1. In the second conveyance path 342, the sheet 90 to be purged to the purge tray 349 is conveyed without passing through the image former 13 (disposed on the conveyance path 141). The first conveyance path 341 extends in a substantially horizontal direction. At least a part of the second conveyance path 342 extends in a substantially vertical direction. In particular, in an area where a stiffness sensor 371 to be described later is disposed, the second conveyance path 342 extends in the substantially vertical direction, and the conveyance direction of the sheet is upward. Here, being substantially vertical indicates being within a range of 90±1°. Note that the second conveyance path 342 is not required to be entirely linear. As long as at least a measurement area of the stiffness sensor 371 in the second conveyance path 342 is straight, the other paths may be partially curved. For example, the second conveyance path 342 may be an S-shaped curved conveyance path as a whole.

As illustrated in FIGS. 1 and 4, the first detector 35 is disposed on the first conveyance path 341, and detects the sheet characteristic of the sheet 90 conveyed on the first conveyance path 341 with the first conveyance path 341 as a detection area. In particular, the first detector 35 is disposed upstream of the branch portion s1 of the first conveyance path 341. The second detector 37 is disposed on the second conveyance path 342 downstream of the branch portion s1.

Figure 5:
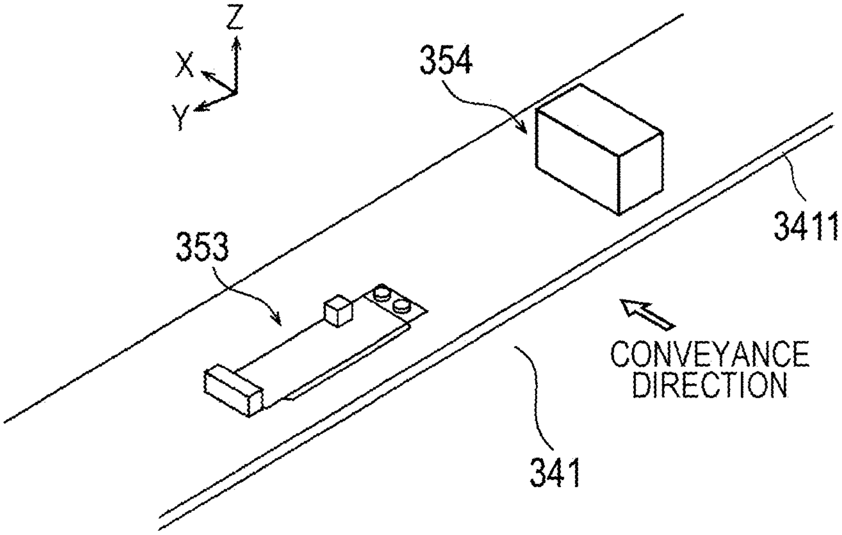
FIG. 5 is a diagram illustrating arrangement positions of a basis weight sensor and a moisture percentage sensor.

As illustrated in FIGS. 3 and 4, the first detector 35 includes a size sensor 351, a sheet thickness sensor 352, a basis weight sensor 353, and a moisture percentage sensor 354. These sensors may use, as the sheet characteristic information, characteristic values or physical property values themselves of the sheet or values indicating the characteristics such as current and voltage of the sensors corresponding to the characteristic values or the physical property values. As illustrated in FIG. 4, the basis weight sensor 353 and the moisture percentage sensor 354 are disposed downstream of the sheet thickness sensor 352 on the first conveyance path 341. FIG. 5 is a diagram illustrating arrangement positions of the basis weight sensor 353 and the moisture percentage sensor 354. As illustrated in FIG. 5, the basis weight sensor 353 and the moisture percentage sensor 354 are arranged at the same position in the conveyance direction (X direction) and at different positions in the width direction (Y direction) on the first conveyance path 341. Thus, the length of the first detector 35 as a whole in the conveyance direction can be shortened, and the space can be reduced. The size sensor 351 is disposed on the first conveyance path 341 upstream of the other sensors. That is, the size sensor 351 is disposed upstream of the sheet thickness sensor 352, the basis weight sensor 353, and the moisture percentage sensor 354. In general, before an image is transferred onto the sheet 90 at the image former 13, a leading end of the sheet is stopped to make the sheet stand by temporarily. By arranging the size sensor 351 upstream of the other sensors, a distance between the size sensor 351 and the image former 13 can be increased, and the sheet 90 can be prevented from stopping during the detection by the size sensor 351.

(Relationship of arrangement positions of each sensor in first detector 35). The first detector 35 includes the size sensor 351, the sheet thickness sensor 352, the basis weight sensor 353, and the moisture percentage sensor 354. These sensors of the first detector 35 detect the sheet characteristic information corresponding to the size, the sheet thickness, the basis weight, and the moisture percentage while conveying the sheet 90 conveyed on the first conveyance path 341 without stopping the sheet 90. Thus, when a print job of continuously performing printing is executed, the first detector 35 can detect the sheet characteristic information of each of a plurality of sheets 90 continuously conveyed. That is, the first detector 35 can detect the sheet characteristic information of all the sheets. Among the above sheet characteristic information, the sheet characteristic information of the size, the sheet thickness, and the basis weight is sheet characteristic information corresponding to a paper type (sheet type), and the sheet characteristic information of the moisture percentage is sheet characteristic information corresponding to a change of state of the sheet 90.

As described above, the first detector 35 detects the sheet characteristic information corresponding to the sheet type or a change in a sheet state of the sheet 90 every time. It is therefore possible to appropriately detect a sheet in any of the following states (hereinafter, referred to as an inappropriate sheet):—a case where the type of the sheet 90 loaded in the sheet feed tray is different from the print job setting;—a case where a wrong sheet is mixed in a bundle of sheets (mainly related to the basis weight, thickness, or size);—a case where the sheet state changes in the middle of continuous printing; and—a case where the bundle of sheets includes a sheet whose sheet state is uneven (mainly in relation to the moisture percentage). Then, as described later, when the sheet characteristic detection device 30 detects an inappropriate sheet 90 by the first detector 35, the image forming system 1000 takes the following measures. The image forming system 1000 switches the sheet 90 to a purge path (the second conveyance path 342) to convey the sheet 90, and ejects the sheet 90 to the purge tray 349. In this way, an inappropriate sheet is not sent to a subsequent stage, and it is possible to prevent a jam or an image defect from occurring in the image forming apparatus 10, the post-processing device 40, or the like.

The size sensor 351 is disposed on the most upstream side. In principle, the size sensor 351 cannot determine the size of the sheet 90 until the sheet 90 passes through a detection position (imaging position). Therefore, the size sensor 351 needs to be disposed further upstream of the image formation position (specifically, a stopping position at a registration roller) of the image former 13 by a distance corresponding to a length of the longest sheet supportable by the image forming system 1000 (for example, a long sheet of about 900 mm). As a result, the size sensor 351 is disposed on the most upstream side on the first conveyance path 341.

The sheet thickness sensor 352 is disposed at the second position from the upstream side. Since the sheet characteristic detection device 30 detects the thickness of the sheet 90 first, it is possible to appropriately set a measurement range (latitude), a measurement condition, and the like at the time of detection by the basis weight sensor 353 and the moisture percentage sensor 354 at the subsequent stage.

(Relationship of arrangement positions of each sensor in second detector 37). As illustrated in FIGS. 3 and 4, the second detector 37 includes the stiffness sensor 371, a surface property sensor 372, and a resistance sensor 373. These sensors may use, as the sheet characteristic information, characteristic values or physical property values themselves of the sheet or values indicating the characteristics such as current and voltage of the sensors corresponding to the characteristic values or the physical property values. As illustrated in FIG. 4, the stiffness sensor 371 and the surface property sensor 372 are disposed upstream of (below) the resistance sensor 373 on the second conveyance path 342. Note that in the example illustrated in FIG. 4, the stiffness sensor 371 and the surface property sensor 372 are arranged in that order in the conveyance direction (Z direction), but this arrangement order may be reversed. For the reason described below, the size sensor 351 is disposed upstream of the moisture percentage sensor 354 on the path from the first conveyance path 341 to the second conveyance path 342.

At the time of detection, the resistance sensor 373 applies a high voltage to the sheet 90 to cause an electric current to flow through the sheet 90. Therefore, the front surface of the sheet 90 whose resistance has been detected may accumulate charges and be electrostatically charged (particularly in a low-humidity environment). Since there is a risk that the stiffness of the electrostatically charged sheet 90 cannot be detected accurately, the stiffness sensor 371 is disposed upstream of (below) the resistance sensor 373. There is a possibility that applying an electric current to the sheet 90 at the time of detection by the resistance sensor 373 slightly heats the sheet 90 and changes the moisture percentage. In order to eliminate this influence, the moisture percentage sensor 354 is disposed upstream of the resistance sensor 373 (on the first conveyance path 341).

The second detector 37 performs detection while stopping the sheet at each sensor position, and sends the sheet 90 to the next sensor on the downstream side. The next sensor performs measurement in a state where a trailing end of the sheet is not pinched by constituent members (rollers or the like) of the previous sensor (by leaving the end open, the sheet is easily pressed for surface fixing by the constituent members of the sensor). Note that when the length (length in the conveyance direction) of the sheet 90 is sufficient, for example, with a size longer than A4 size, the sheet 90 can be disposed over detection positions of the three sensors. Therefore, the second detector 37 can simultaneously perform the following detections by one stop, and a decrease in productivity can be minimized.—Resistance detection by the resistance sensor 373.—Surface property detection by the surface property sensor 372.—Stiffness detection by the stiffness sensor 371.

(First detector 35). Hereinafter, configuration examples of the size sensor 351, the sheet thickness sensor 352, the basis weight sensor 353, and the moisture percentage sensor 354 will be described with reference to FIGS. 6 to 9. As described above, these sensors 351 to 354 detect the sheet characteristic information corresponding to the size, the sheet thickness, the basis weight, and the moisture percentage while conveying the sheet 90 conveyed on the first conveyance path 341 without stopping the sheet 90. In particular, these sensors 351 to 354 detect the sheet characteristic information while conveying the sheet 90 at a conveyance speed during image formation (hereinafter, also referred to as a normal conveyance speed). In this manner, the sheet characteristic information of all the sheets 90 is detected without degrading the productivity.

Figure 6:
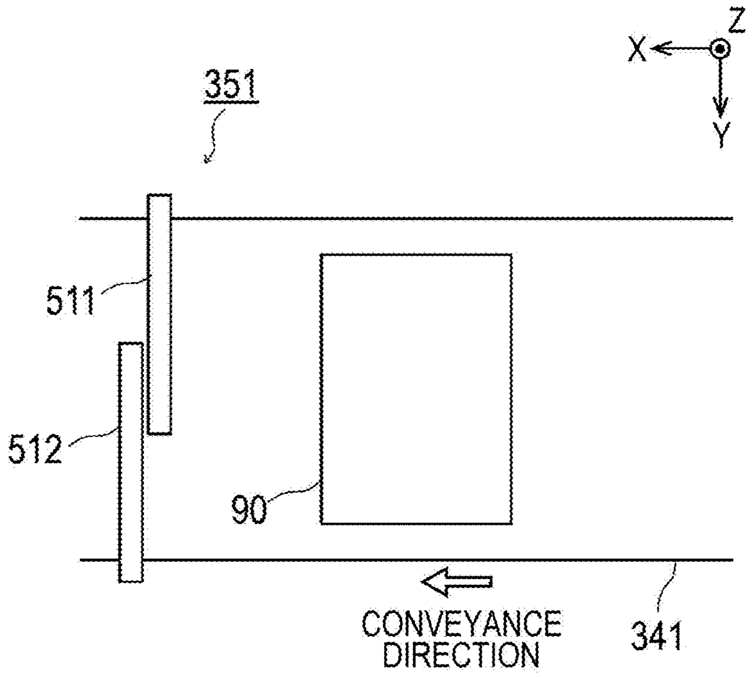
FIG. 6 is a diagram illustrating a schematic configuration of a size sensor.

(Size sensor 351). The size sensor 351 optically detects the size (shape) of the sheet 90. The size sensor 351 includes, for example, one or two image sensors. FIG. 6 is a diagram illustrating a schematic configuration of the size sensor 351. In the example illustrated in FIG. 6, the size sensor 351 includes two line sensors 511 and 512. Each of the line sensors 511 and 512 is an image sensor in which photoelectric conversion elements configured by a contact image sensor (CIS) or the like are arranged in one line or a plurality of lines, and reads a one-dimensional image. A line sensor 171 includes optical elements such as light emitting elements or lens arrays arranged along the line of the photoelectric conversion elements. The light emitting elements emit light that is uniform in an extending direction of the line toward the sheet 90 on the first conveyance path 341. In the example illustrated in FIG. 6, each of the line sensors 511 and 512 has a length of 200 mm to 300 mm in a longitudinal direction. The line sensors 511 are arranged adjacent to each other in the conveyance direction (X direction) so as to overlap each other in the width direction (Y direction). Thus, a full width of the conveyed sheet 90 is read, corresponding to the sheet 90 of A3 extension size or the like. Both of the line sensors 511 and 512 read the sheet 90 conveyed at a predetermined conveyance speed to generate read image data. The controller 31 performs image processing on the obtained read image data for one sheet 90 to detect edges (positions of four sides or an outer shape) of the sheet 90 and detect the size (shape) of the sheet 90. The controller 31 may detect the shape and size of the sheet 90 by processing each of the two pieces of read image data obtained from the two sensors 511 and 512. Alternatively, the controller 31 may combine the two pieces of read image data into one piece of data and process the combined data to detect the shape and size of the sheet 90. Furthermore, in the example illustrated in FIG. 6, an example has been illustrated in which the two sensors 511 and 512 are disposed so as to overlap each other in the widthwise direction, but one large sensor may be used corresponding to the size of A3 extension or the like.

Figure 7:
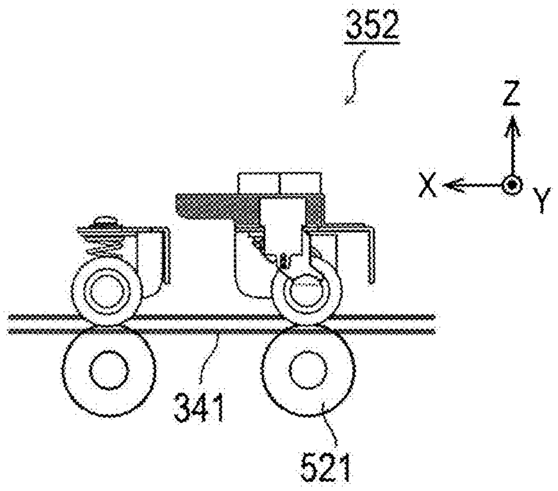
FIG. 7 is a diagram illustrating a schematic configuration of a sheet thickness sensor.

(Sheet thickness sensor 352). FIG. 7 is a diagram illustrating a schematic configuration of the sheet thickness sensor 352. The sheet thickness sensor 352 detects the thickness of the sheet 90 by mechanically measuring a displacement amount. When the sheet 90 is conveyed to a nip of the conveyance roller pair 521, an axial position of one of driven rollers of the conveyance roller pair 521 is displaced in accordance with the thickness of the sheet 90. The thickness of the sheet 90 is measured by measuring a height of the displaced axis. In the conveyance roller pair 521, the lower roller of two rollers is a fixed driving roller (an axis center is fixed), and the upper roller is a driven roller biased so as to be attachable to and detachable from the driving roller. The height of the upper roller is detected by a displacement sensor. The displacement sensor includes an actuator (detection lever) that is in contact with the shaft of the upper roller and an encoder that measures the rotation amount of the actuator. For example, the sheet thickness (micron) is output from the sheet thickness sensor 352 as a measurement result of the sheet thickness.

Figure 8:
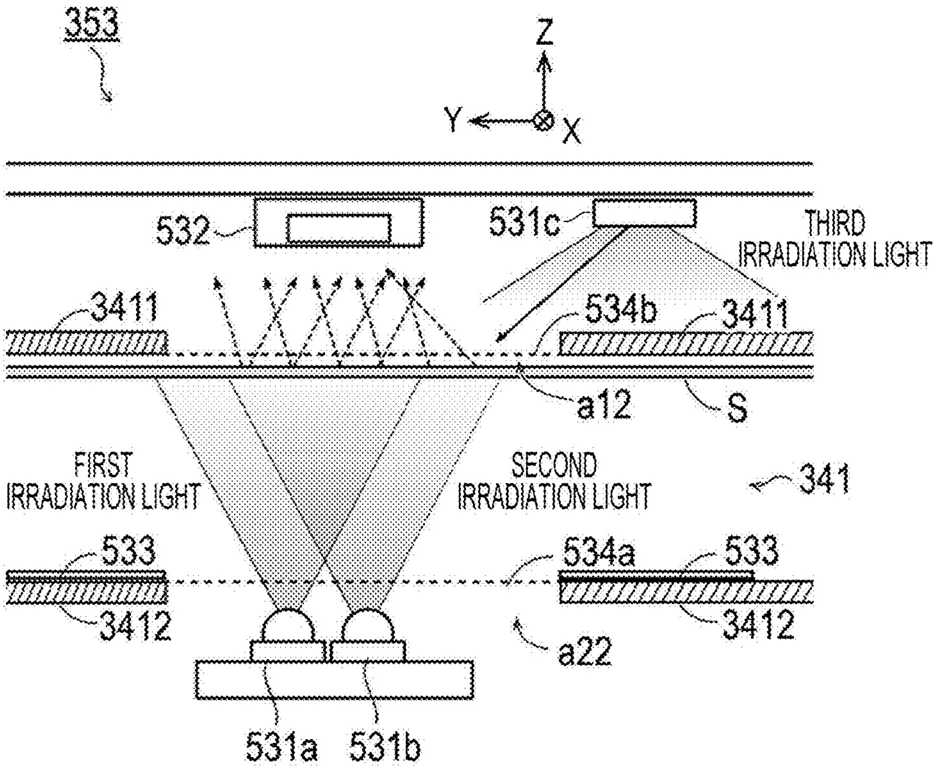
FIG. 8 is a diagram illustrating a schematic configuration of the basis weight sensor.

(Basis weight sensor 353). FIG. 8 is a diagram illustrating a schematic configuration of the basis weight sensor 353. The basis weight sensor 353 is a transmission or reflection optical sensor that detects the basis weight of a sheet. The optical sensor includes a light emitter and a light receiver, and detects the basis weight of the sheet 90 by measuring an attenuation amount (transmittance) of light transmitted through the sheet 90 and a reflection light amount.

As illustrated in FIG. 8, the basis weight sensor 353 includes a plurality of light emitters 531 and a single light receiver 532. The light emitter 531 includes a first light emitter 531*a*, a second light emitter 531*b*, and a third light emitter 531*c*. First, second, and third irradiation lights are emitted to an irradiation area from the first, second, and third light emitters, respectively. The irradiation area (second irradiation area) is an inner area in an opening a12 when viewed from the Z direction. The opening a12 is provided in an upper guide plate 3411. A lower guide plate 3412 is also provided with an opening a12 at a position opposed to the opening a22. The openings a12 and a22 have the same shape, for example, a rectangular shape. In order to prevent a foreign substance such as sheet dust from the sheet 90 passing through the first conveyance path 341 from adhering to the openings a12 and a22, transparent sheets 534*a* and 534*b* that includes PET or the like and that allow the wavelengths of the respective irradiation lights to pass through are attached to the openings a12 and a22.

The first light emitter 531*a* emits the first irradiation light having a first wavelength. The first wavelength is, for example, a wavelength of near-infrared light longer than a wavelength of visible light. Specifically, the first wavelength includes, for example, a wavelength between 750 nm and 900 nm. The second light emitter 531*b* emits the second irradiation light having a second wavelength. The second wavelength is, for example, a wavelength of blue light included in visible light. Specifically, the second wavelength includes, for example, a wavelength between 400 nm and 470 nm. Both the first light emitter 531*a* and the second light emitter 531*b* are disposed opposite to the light receiver 532 across the first conveyance path 341. The third light emitter 531*c* is provided on the same side as the light receiver 532 and near the light receiver 532. The third light emitter 531*c* emits the third irradiation light having a third wavelength toward the irradiation area (the opening a12). The third wavelength is, for example, a wavelength of green light included in visible light. Specifically, the third wavelength includes, for example, a wavelength between 495 nm and 570 nm. The third wavelength is different from the first wavelength (for example, a wavelength between 750 nm and 900 nm) and the second wavelength (for example, a wavelength between 400 nm and 470 nm).

The third irradiation light is emitted toward the first conveyance path 341 between the upper and lower guide plates 3411 and 3412. A reflector 533 is provided on an inner side of the lower guide plate 3412 provided near the first light emitter 531*a* and the second light emitter 531*b*. The reflector 533 is, for example, coated with green, which is the same color as the third irradiation light, and reflects the third irradiation light. The reflector 533 does not reflect the first irradiation light (near-infrared light) and the second irradiation light (blue light), which do not have the same color as the third irradiation light.

In the present embodiment, in measurement, the controller 31 controls the first light emitter 531*a* and the second light emitter 531*b* to cause the first light emitter 531*a* and the second light emitter 531*b* to emit the first irradiation light and the second irradiation light at different timings. The light receiver 532 receives the first irradiation light and the second irradiation light, detects the respective light amounts of the first irradiation light and the second irradiation light, and outputs, to the controller 31, the detected light amount of the first irradiation light and the detected light amount of the second irradiation light. Similarly, the controller 31 irradiates the sheet 90 conveyed to the position of the opening a12 with the first irradiation light and the second irradiation light. The light receiver 532 receives the transmitted lights of the first irradiation light and the second irradiation light (a first transmitted light and a second transmitted light), detects the light amounts of the first transmitted light and the second transmitted light, and outputs, to the controller 31, the detected light amount of the first transmitted light and the detected light amount of the second transmitted light. That is, the light receiver 532 detects the first irradiation light and the second irradiation light when the sheet 90 is absent, and detects the first transmitted light and the second transmitted light when the sheet 90 is present at the opening a12.

Regarding the third light emitter 531*c*, similarly, the light receiver 532 detects a first reflection light reflected by the reflector 533 when the sheet 90 is absent, and detects a second reflection light reflected by the front surface of the sheet 90 when the sheet 90 is present at the opening a12.

The controller 31 calculates the first transmittance by dividing the light amount of the first transmitted light by the light amount of the first irradiation light. Similarly, the controller 31 calculates the second transmittance by dividing the light amount of the second transmitted light by the light amount of the second irradiation light. Then, the type of the sheet 90 is determined from the first transmittance and the second transmittance and a determination criteria stored in the storage 12.

The controller 31 may calculate a reflectance by dividing the light amount of the second reflection light by the light amount of the first reflection light in addition to the first transmittance and the second transmittance, and may determine the type of the sheet 90 in consideration of the reflectance. The third light emitter 531*c* and the reflector 533, which are provided in the present embodiment, may be omitted.

Figure 9:
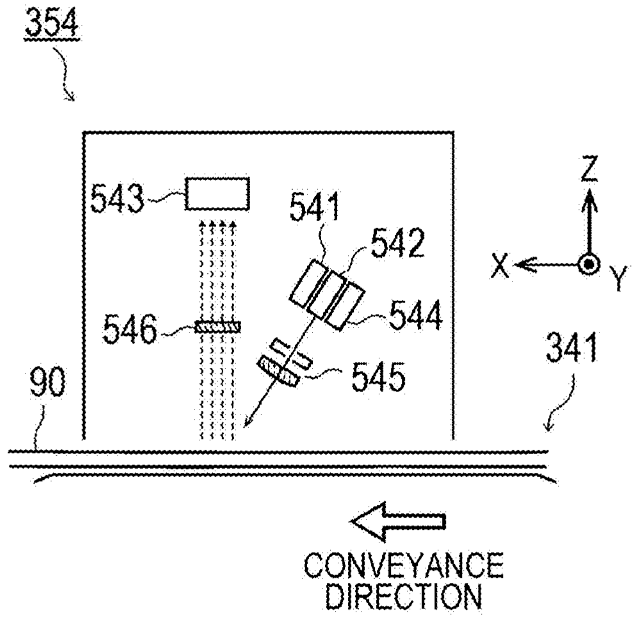
FIG. 9 is a diagram illustrating a schematic configuration of the moisture percentage sensor.

(Moisture percentage sensor 354). FIG. 9 is a diagram illustrating a schematic configuration of the moisture percentage sensor 354. The moisture percentage sensor 354 measures the moisture percentage of the sheet 90. Note that in the present embodiment, the moisture percentage sensor that measures a water content of the sheet as the sheet characteristic information will be described as an example. However, a moisture amount sensor that measures an amount of moisture contained in the sheet as the sheet characteristic information may be applied.

As illustrated in FIG. 9, the moisture percentage sensor 354 includes a first light emitter 541, a second light emitter 542, a light receiver 543, a temperature detection sensor 544, lenses 545 and 546, and the like. The first light emitter 541 and the second light emitter 542 are light emitters that emit light toward a sheet.

The first light emitter 541 emits a first near-infrared light (reference light) in a specific wavelength band toward the sheet P. Specific examples of the first light emitter 541 include a light emitting diode (LED). The first near-infrared light is light whose absorptance by the sheet P upon reflection off the sheet P is not dependent on the moisture percentage of the sheet P. The light receiver 543 receives, via the lens 546, the first near-infrared light emitted from the first light emitter 541 and reflected by the sheet P via the lens 545. Then, the light receiver 543 outputs, to the controller 31, information of a first light reception amount which is a light reception amount of the reflected first near-infrared light. Specific examples of the light receiver 543 include a charge-coupled device (CCD) and a complementary metal-oxide-semiconductor (CMOS) image sensor.

The second light emitter 542 emits a second near-infrared light in a specific wavelength band toward the sheet P. Specific examples of the second light emitter 542 include an LED. The second near-infrared light is light whose absorptance by the sheet P upon reflection off the sheet P varies with the moisture percentage of the sheet P. The light receiver 543 receives, via the lens 546, the second near-infrared light emitted from the second light emitter 542 and reflected by the sheet P via the lens 545. Then, the light receiver 543 outputs, to the controller 31, information of a second light reception amount which is a light reception amount of the reflected second near-infrared light.

That is, the first light emitter 541 and the second light emitter 542 emit lights having wavelengths with different absorptance by moisture of the sheet. The second near-infrared light emitted by the second light emitter 542 is light having a wavelength that is absorbed more by the moisture of the sheet than the first near-infrared light (reference light) emitted by the first light emitter 541.

The controller 31 determines the moisture percentage of the sheet based on a ratio of the first light reception amount and the second light reception amount (a ratio of the output of the light receiver 543 to the first near-infrared light and the second near-infrared light). As the moisture percentage of the sheet is higher, an absorption amount of the second near-infrared light is larger, and thus the second light reception amount is smaller. Therefore, based on a relational expression or a table indicating a relationship between the moisture percentage of the sheet and the ratio of the first light reception amount and the second light reception amount, the controller 31 can associate the ratio of the first light reception amount and the second light reception amount with the moisture percentage of the sheet, and calculate the moisture percentage of the sheet from the ratio of the first light reception amount and the second light reception amount.

(Second detector 37). Hereinafter, configuration examples of the stiffness sensor 371, the surface property sensor 372, and the resistance sensor 373 will be described with reference to FIGS. 10 to 12. These sensors 371 to 373 detect sheet characteristic information corresponding to the stiffness, the surface property, and the electric resistance while stopping the sheet 90 conveyed on the second conveyance path 342 or conveying the sheet 90 at a speed lower than the normal conveyance speed.

Figure 10:
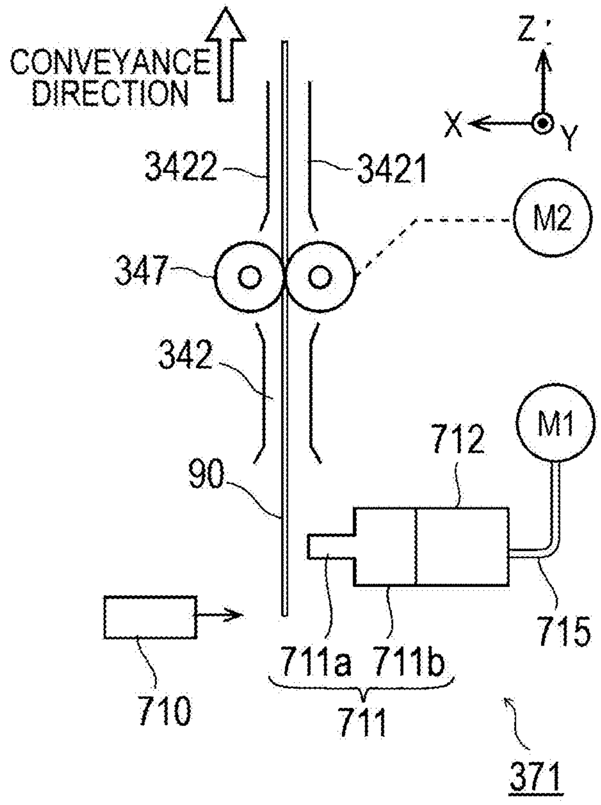
FIG. 10 is a diagram illustrating a schematic configuration of a stiffness sensor.

(Stiffness sensor 371). FIG. 10 is a diagram illustrating a schematic configuration of a stiffness sensor 371. The stiffness sensor 371 detects the stiffness of the sheet 90 by mechanically measuring a displacement amount.

The stiffness sensor 371 is disposed vertically below a pair of rollers 347 that holds the stopped sheet 90. Rotational driving of the rollers 347 is controlled by a motor M2. The rollers 347 function as conveyors for conveying the sheet 90 in the second conveyance path 342, and functions as a holder when the stiffness is measured. The stiffness sensor 371 includes a sheet detection sensor 710, a presser 711, a pressing force detector 712, a support mechanism 715, and a motor M1. The motor M1 moves the support mechanism 715 in the horizontal direction (X direction). Accordingly, a tip of the presser 711 connected to the support mechanism 715 is disposed at a predetermined position in the X direction when the stiffness is measured. The sheet detection sensor 710 is a non-contact optical sensor and detects the presence or absence of a sheet, that is, the trailing end of the sheet at a detection position (indicated by an arrow in FIG. 10).

When the stiffness is measured, the sheet 90 conveyed on the second conveyance path 342 is stopped so that the trailing end is located at the detection position of the sheet detection sensor 710 (or a position a predetermined amount past from the detection position). In a stopped state, the trailing end of the sheet 90 is a free end as illustrated in FIG. 10. The presser 711 of the stiffness sensor 371 presses a lower end of the sheet 90 from a lateral direction. Specifically, the stiffness sensor 371 presses the lower end of the sheet 90 from the horizontal direction at a position higher than the detection position by a specific distance.

The presser 711 includes a blade 711*a* and a base 711*a* continuous with one end of the blade 711*b* in the horizontal direction (X direction). The blade 711*a* has a long plate-like shape that is long in the width direction (Y direction) so as to be able to contact the full width of the sheet 90 conveyed in the vertical direction (Z direction). The blade 711*a* comes into contact with the sheet 90 at a position (measurement point) vertically above and apart from the lower end of the sheet 90 by a specific distance. That is, the measurement point is located vertically below a portion of the sheet 90 held by the roller 347.

The pressing force detector 712 is connected to a surface of the presser 711 opposite to a surface of the base 711*b* continuous with the blade 711*a*. The pressing force detector 712 detects a pressing force applied when the presser 711 is pressed in the horizontal direction by a repulsive force (rigidity) of the sheet 90 when the blade 711*a* of the presser 711, which is disposed at a predetermined position in the X direction by the motor M1 and the support mechanism 715, presses the sheet 90. That is, the pressing force detector 712 detects the pressing force applied when the sheet 90 is pressed and bent by the presser 711. As the pressing force detector 712, for example, a load cell (pressure sensor) can be adopted.

Figure 11:
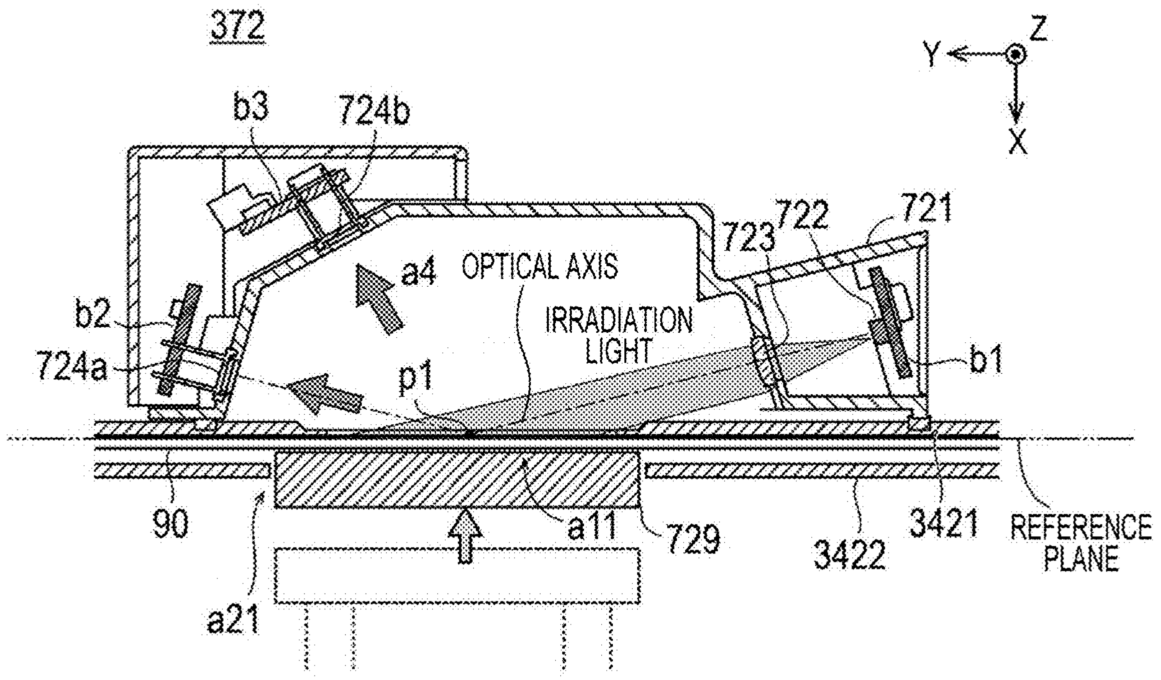
FIG. 11 is a diagram illustrating a schematic configuration of a surface property sensor.

(Surface property sensor 372). FIG. 11 is a diagram illustrating a schematic configuration of the surface property sensor 372. The surface property sensor 372 is a reflection (specular reflection or diffuse reflection) optical sensor that detects the surface property of the sheet 90.

The surface property sensor 372 detects the surface property of the sheet 90 based on absolute values and ratios of intensities of the detected specular reflection light and scattered reflection light.

The upper guide plate 3411 located on the right side of the second conveyance path 342 is provided with an opening a11, and the lower guide plate 3412 located on the left side of the second conveyance path 342 is provided with an opening a21. The opening a11 has a substantially rectangular shape, and has a hole size of, for example, several tens of millimeters in length and width (Z direction and Y direction). The opening a21 is disposed at a position corresponding to the opening a11 and is slightly larger than the opening a11. A pressing plate 729 of a pressing mechanism is disposed in the opening a21, and moves from the left side to the right side in FIG. 10 to press and fix the sheet 90 to the upper guide plate 3411 at the time of measurement. When measurement is not performed, the opening a11 is closed by a shutter (not illustrated). The opening a21 is closed by the slightly retracted front surface of the pressing plate 729.

The surface property sensor 372 detects the surface property by arranging the front surface of the stopped sheet 90 on a reference plane of the opening a11, irradiating the opening a11 with light as an irradiation area, and receiving the specular reflection light and the scattered reflection light. The reference plane corresponds to an inner surface of the upper guide plate 3421.

As illustrated in FIG. 11, the surface property sensor 372 includes a housing 721, a light emitter 722, a collimating lens 723, and a plurality of light receivers 724*a* and 724*b* (hereinafter, also collectively referred to as a light receiver 724). The surface property sensor 372 detects, with the light receiver 724*a*, reflection light of the light emitted from the light emitter 722 and reflected from the front surface of the sheet 90, and detects scattered reflection light with the light receiver 724*b* or the like.

An arrangement angle of the light emitter 722 is set such that an incident angle of the irradiation light with respect to the reference plane is 75°. The incident angle of 75° is an angle used for measurement of white paper glossiness according to JIS, and is an angle at which the color of an object to be measured has little influence. The reference plane is an imaginary plane including a lower surface of the upper guide plate 3421, and the front surface of the sheet 90 as an object to be measured is disposed on the reference plane at the time of measurement. The light emitter 722 is disposed on a substrate b1. The light emitter 722 includes a light emitting element serving as light source, such as an LED, which emits light having a predetermined wavelength, and irradiation light emitted from the light source (point light source) is turned into substantially parallel light by the collimating lens 723 and is emitted to the irradiation area. In the present embodiment, the wavelength of the light source of the light emitter 722 is preferably in a range of more than 405 nm and less than 525 nm. The wavelength of the light source of the light emitter 722 is more preferably in a range of 445 nm or more and 500 nm or less, and most preferably around 465 nm. The irradiation area (first irradiation area) is an inner area in the opening a11 when viewed from a Z' direction, and a center (optical axis) of the irradiation area and a reference plane parallel to an XY' plane intersect at an intersection p1. As the light emitter 722, a surface-emitting LED may be used, or a shell-shaped LED may be used. When a shell-shaped LED is used, a desired irradiation diameter (also referred to as a beam diameter) can be obtained by designing a lens suitable for directionality of the shell shape. The light emitter 722 and the light receiver 724 are disposed along the width direction (Y direction), that is, on the same XY plane, and the irradiation light from the light emitter 722 is along the width direction.

Each of the plurality of light receivers 724 includes a light receiving element such as a photodiode or a phototransistor. The light receiver 724 includes a first light receiver 724*a* that receives specular reflection light from the irradiation area and one or a plurality of second light receivers **724*b* that receives diffuse reflection light from the irradiation area. The first light receiver 724*a* is disposed at a position of a reflection angle of 75° corresponding to the incident angle of 75° of the light emitter 722, and receives the specular reflection light. The second light receiver 724*b* can be disposed at a position of any reflection angle within a range of a reflection angle of 0° or more and less than 90° except for a position of 75°, and receives the diffuse reflection light. The arrangement positions are preferably positions at reflection angles of 60°, 30°, and 0°, and more preferably two positions at 60° and 30° or one position at 60°. FIG. 11 illustrates an example in which the first light receiver 724*a* for receiving specular reflection light having a reflection angle of 75° and the second light receiver 724*b* for receiving diffuse reflection light having a reflection angle of 30° are disposed. In these drawings, the light receiver 724*a* is disposed on a substrate b2, and the light receiver 724*b* is disposed on a substrate b3. On light reception paths of the light receivers 724*a* and 724*b*, the housing 721** is provided with openings a3 and a4. The openings a3 and a4 have a similar structure. The openings a3 and a4 are, for example, circular slits of φ3 mm when viewed from the intersection p1.

Figure 12:
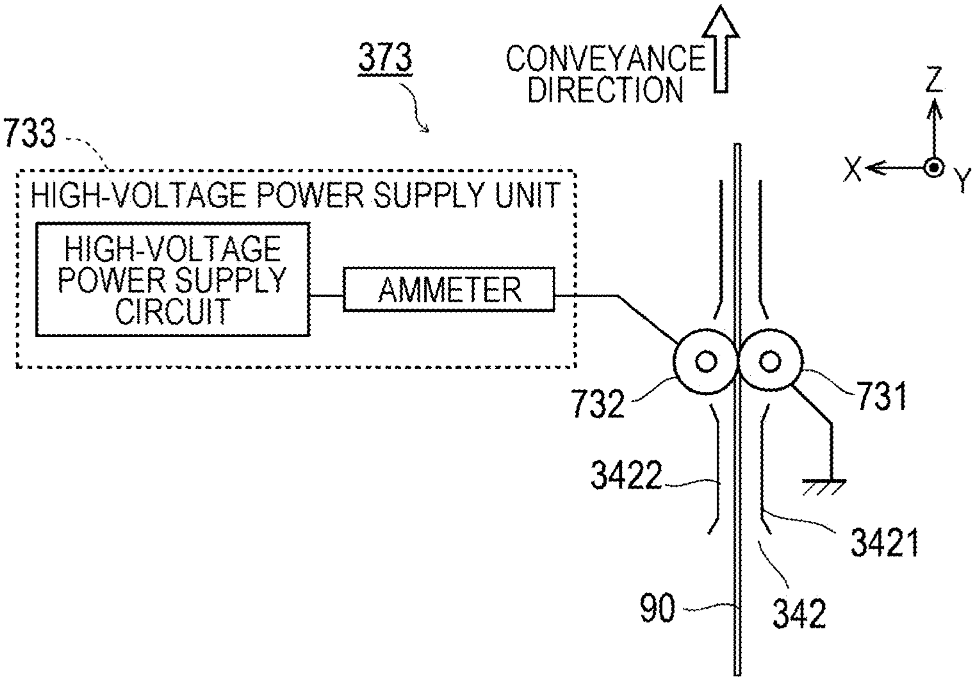
FIG. 12 is a diagram illustrating a schematic configuration of a resistance sensor.

(Resistance sensor 373). FIG. 12 is a diagram illustrating a schematic configuration of the resistance sensor 373. The resistance sensor 373 applies a high voltage between the front and back of the sheet 90 in a stopped state, and detects the electric resistance (volume electric resistance) of the sheet 90 by the value of a flowing current.

As illustrated in FIG. 12, the resistance sensor 373 includes a detection roller 732, an opposing roller 731, and a high-voltage power supply unit 733.

The detection roller 732 is disposed so as to be able to contact one side of the sheet 90. The detection roller 732 includes, for example, an elastic material such as rubber having conductivity.

The opposing roller 731 is disposed opposite to the detection roller 732 with the sheet 90 interposed therebetween. The opposing roller 731 is disposed so as to be able to contact the other side of the sheet 90. The opposing roller 731 includes, for example, a metal material. The opposing roller 731 is grounded.

The high-voltage power supply unit 733 is a unit for applying a high voltage to the sheet 90. The high-voltage power supply unit 733 is electrically connected to the detection roller 732 and the opposing roller 731. Thus, an electric circuit is formed by the detection roller 732, the opposing roller 731, and the high-voltage power supply unit 733. The high-voltage power supply unit 733 includes an ammeter and a high-voltage power supply circuit. The ammeter is electrically connected to the detection roller 732. The ammeter detects a current flowing due to a voltage applied in the high-voltage power supply circuit.

The high-voltage power supply circuit is electrically connected to the detection roller 732 via the ammeter. The high-voltage power supply circuit can apply a high voltage. A voltage is applied to the detection roller 732 from a high-voltage power supply circuit via the ammeter. The high-voltage power supply circuit can apply a high voltage of 1 k to 5 kV, for example. As a method of applying a voltage in the high-voltage power supply circuit, one type of voltage may be applied to the sheet 90, or a plurality of types of applied voltages may be applied to the sheet 90 by being controlled a plurality of times.

(Determination of Control Parameter)

Hereinafter, referring to FIGS. 13 and 14, a determination processing of the control parameter using the sheet characteristic acquired by the sheet characteristic detection device 30 will be described.

Figure 13:
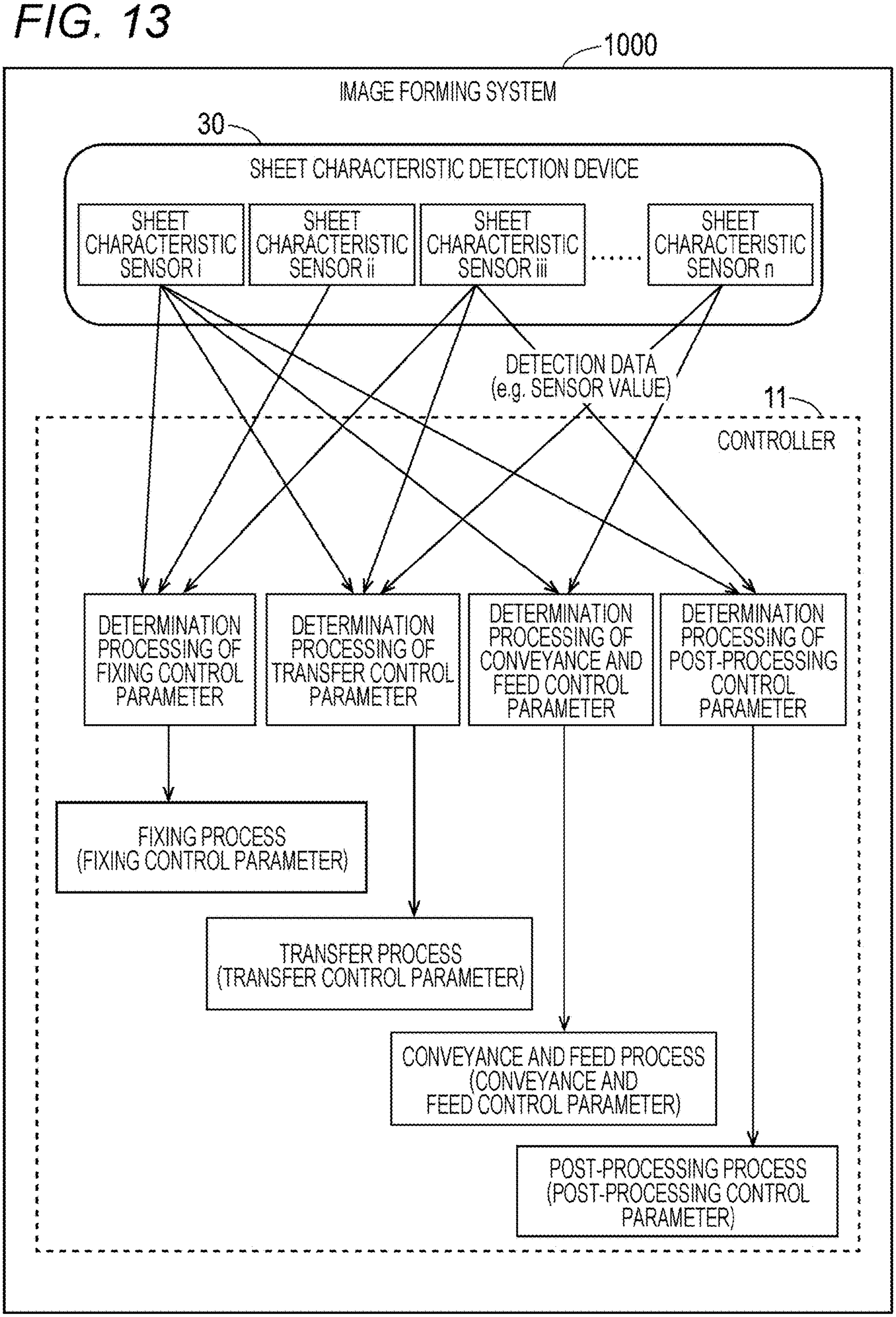
FIG. 13 is a schematic diagram illustrating a control parameter determination method.

FIG. 13 is a schematic diagram illustrating a control parameter determination method; In a conventional control parameter determination method, detection data is once converted into a sheet type and a basis weight to be classified, and then a control parameter is determined. In the control parameter determination method according to the present embodiment, each control parameter is determined directly from the detection data of the sheet characteristic. For example, the controller 11 of the image forming apparatus 10 determines a fixing control parameter from the detection data of sheet characteristic sensors i to iii, and determines transfer control parameter from the detection data of the sheet characteristic sensors i, iii, and n. The sheet characteristic sensors i to n correspond to any of the sensors 351 to 354 and 371 to 373 of the sheet characteristic detection device 30 described above.

FIG. 14 is a diagram for describing a quality item in each process of image forming processing and a sheet characteristic related to each quality item; and FIG. 14 illustrates a relationship between quality items such as fixing quality, secondary transfer quality, conveyance quality, and sheet ejection quality existing in each of a fixing process, a transfer process, a conveyance process, a discharging process, and the like included in the image forming processing, and sheet characteristics related to each of the quality items. Examples of the sheet characteristics detected by the sheet characteristic sensors include a size, sheet thickness, basis weight, moisture percentage, stiffness, surface property, resistance (volume resistance value), and bending strength.

As for the "size", a sensor 1 detects the size of the sheet. For example, the size can be detected by analyzing a read image data obtained by the size sensor 351.

The "sheet thickness" is acquired by a sensor 2 detecting a characteristic corresponding to the thickness of the sheet. The "sheet thickness" is acquired by, for example, the sheet thickness sensor 352, and is acquired by sandwiching the sheet between two members and measuring a distance between the two members.

The "basis weight" is acquired by a sensor 3 detecting a characteristic corresponding to the basis weight of the sheet. The "basis weight" is acquired by, for example, the basis weight sensor 353. The "basis weight" is acquired, for example, by measuring an attenuation amount (transmittance) of light transmitted through the sheet by a transmission or reflection optical sensor.

The "moisture percentage" is acquired by a sensor 4 detecting a characteristic corresponding to the moisture percentage (also referred to as water content) of the sheet. The "moisture percentage" is acquired by, for example, the moisture percentage sensor 354. The "moisture percentage" is acquired by, for example, a water content sensor that optically detects a light absorption amount of an OH group of a near-infrared system by transmitted light of the sheet. The "moisture percentage" constitutes a value related to a sheet moisture percentage.

The "stiffness" is acquired by a sensor 5 detecting a characteristic corresponding to the stiffness of the sheet. The "stiffness" is acquired by, for example, the stiffness sensor 371 measuring the pressing force generated when the trailing end of the sheet as a free end is pressed. The "stiffness" constitutes a value related to sheet bending strength.

The "surface property" is acquired by a sensor 6 detecting a characteristic corresponding to smoothness of the surface property of the sheet. The "surface property" is also referred to as smoothness and is acquired by the surface property sensor 372. The "surface property" is acquired, for example, by irradiating the surface of the sheet with light at an incident angle of 75° and optically detecting specular reflection light and diffuse reflection light from the front surface of the sheet by two sensors. The "surface property" constitutes a value related to a sheet surface state.

The "sheet resistance" is acquired by a sensor 7 detecting a characteristic corresponding to the electrical resistance of the inside or the front surface of the sheet. The "sheet resistance" is acquired by, for example, the resistance sensor 373. The "sheet resistance" is acquired by, for example, measuring a voltage and a flowing current when a high voltage is applied to the sheet. The "sheet resistance" constitutes a value related to sheet volume resistance.

Figure 15:
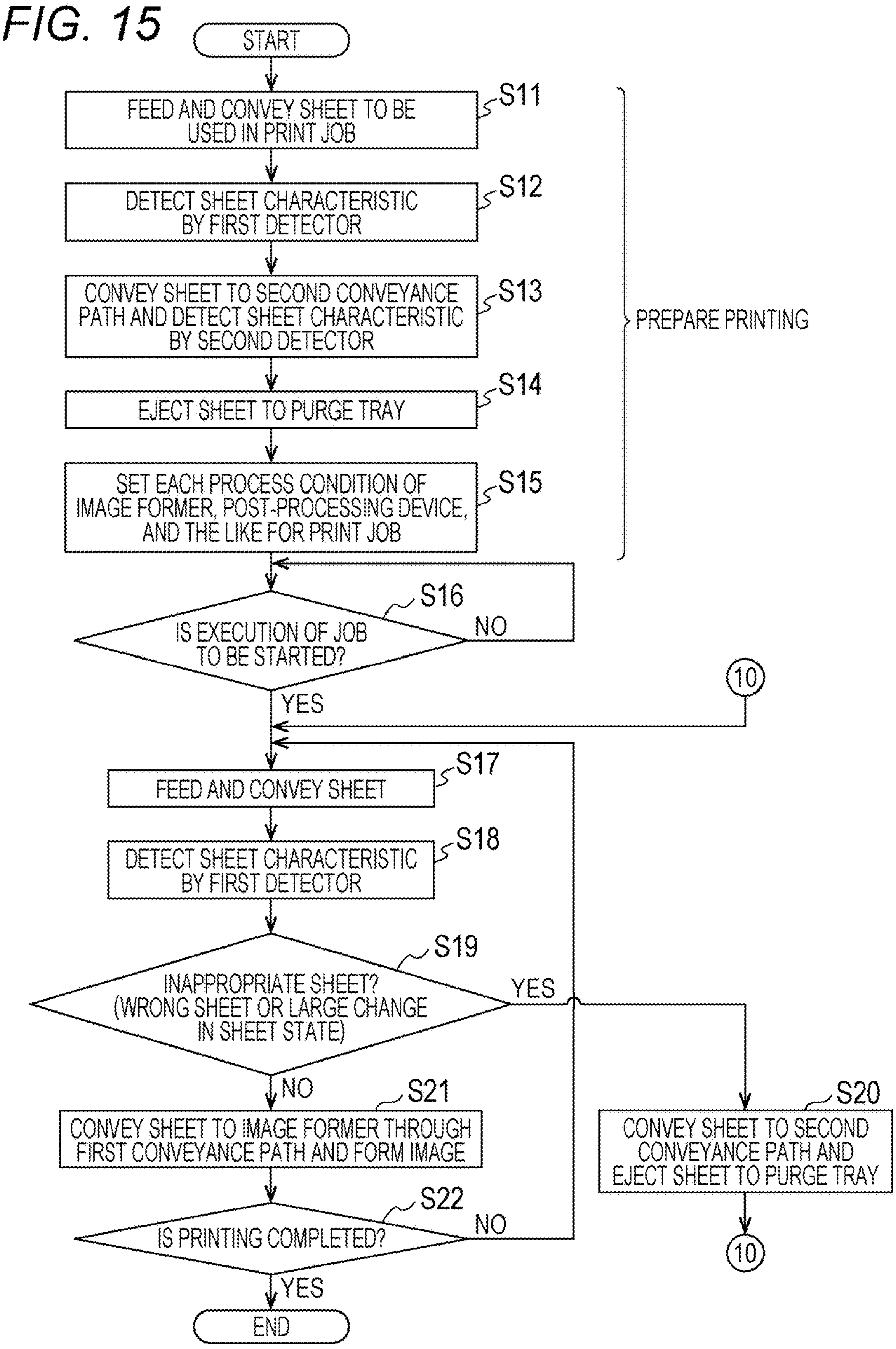
FIG. 15 is a flowchart illustrating sheet characteristic detection processing.

(Sheet characteristic detection processing). FIG. 15 is a flowchart illustrating sheet characteristic detection processing executed by the image forming system 1000 and the sheet characteristic detection device 30. Steps S11 to S16 are printing preparation processing, and step S17 and subsequent steps are processing for executing printing.

(Step S11). When a print job is input in response to an instruction transmitted from an external terminal such as a PC, the controller 11 feeds and conveys a sheet to be used in the print job based on print job setting information of the input print job. For example, the controller 11 causes the sheet feed tray 245 of the sheet feed device 20 to feed the sheet 90 (the first sheet on the sheet feed tray 245), and causes the first conveyance path 341 to convey the sheet 90.

(Step S12). The controller 31 controls the conveyor 34 and the first detector 35, and causes the first detector 35 to detect a sheet characteristic of the sheet 90 conveyed on the first conveyance path 341. During the detection by the first detector 35, the sheet 90 is conveyed at the normal conveyance speed and is not stopped.

(Step S13). The controller 31 controls the conveyor 34 and the second detector 37 to cause the sheet 90 to branch and be conveyed to the second conveyance path 342, and causes the second detector 37 to detect the sheet characteristic of the sheet 90. During the detection by the second detector 37, the sheet 90 is stopped once or a plurality of times.

(Step S14). The controller 31 controls the conveyor 34 to eject the sheet 90 whose sheet characteristic has been detected to the purge tray 349.

(Step S15). The controller 11 of the image forming apparatus 10 determines a parameter of each process of the image former 13 and the like by using a plurality of pieces of sheet characteristic information obtained by the first detector 35 and the second detector 37 by the processing of steps S12 and S13. Specifically, the controller 11 determines a control parameter of each process of fixing, transfer, conveyance and feed, and post-processing by the processing illustrated in FIG. 13.

(Step S16). The controller 31 determines whether to start execution of the print job, and advances the processing to step S17 if YES. The determination of execution of start may be made by the user pressing an execution start button, or the execution may be automatically started when the processing of step S15 ends.

(Step S17). The controller 31 feeds and conveys the sheet 90 (the second and subsequent sheets on the sheet feed tray 245) set in the print job setting of the print job. When the print job setting is a setting for a plurality of sheets, the plurality of sheets 90 are continuously fed and conveyed. For example, the controller 11 controls the sheet feed device 20 to continuously feed and convey the sheets 90 from the sheet feed tray 245.

(Step S18). The controller 31 controls the conveyor 34 and the first detector 35, and causes the first detector 35 to detect a sheet characteristic of the sheet 90 conveyed on the first conveyance path 341. As in step S12, during the detection by the first detector 35, the sheet 90 is conveyed at the normal conveyance speed and is not stopped.

(Step S19). The controller 11 determines whether each of the continuously conveyed sheets 90 is an inappropriate sheet from the sheet characteristic information acquired in step S18. Examples of the above include a case where a sheet having a size or a type different from the size or type of the sheet 90 set in the print job setting is mixed in the bundle of sheets (outside the print job setting), or a case of the sheet 90 having a moisture percentage greatly different from the moisture percentage of the sheet 90 up to that time (a large change in the sheet state). Examples of the above include a case where a slip sheet having a different size is mixed in the bundle of sheets loaded in the sheet feed tray 245, or a case where the sheet feed tray 245 is replenished with the sheet 90 having a different size or a different sheet type by mistake of the user. The case where the moisture percentage is different is a case where the sheets are replenished from another package (not exposed to a high-humidity environment) on the bundle of sheets (remaining sheets) in the sheet feed tray 245 that has been left under the high-humidity environment for a long time.

When a sheet outside the printing job setting or a sheet whose state has changed largely due to a sheet characteristic is conveyed, the controller 11 determines that the sheet is outside a predetermined range (YES) and advances the processing to step S20. On the other hand, when the sheet is within the predetermined range (NO), the controller 11 advances the processing to step S21.

(Step S20). The controller 31 controls the conveyor 34 to cause the sheet 90 (a sheet outside the predetermined range) being conveyed on the first conveyance path 341 to branch at the branch portion s1, to be guided to the second conveyance path 342, and to be ejected to the purge tray 349. When a predetermined number or more of sheets outside the predetermined range are continuously detected, the controller 31 may stop the print job being executed. At this time, the controller 11 may cause the operation panel 15 to display, as an alert to the user, information indicating that a sheet outside the predetermined range has been detected and/or that the print job has been stopped.

(Step S21). The controller 11 continues conveyance of the sheet 90, conveys the sheet 90 to the image former 13 via the first conveyance path 341 and the conveyance path 141, and causes the image former 13 to form an image. The sheet on which an image has been formed is then ejected to the sheet ejection tray 41 of the post-processing device 40.

(Step S22). When the print job is not completed (NO), the controller 11 repeats the processing in step S17 and subsequent steps until the print job is completed. When the printing up to the set number of sheets of the print job is completed (YES), the processing ends (END).

As described above, the sheet characteristic detection device according to the present embodiment includes the first conveyance path on which the sheet is conveyed, the second conveyance path that is branched from the first conveyance path and on which a sheet to be purged is conveyed without passing through the image former, and the first detector that is disposed on the first conveyance path and allows detection of sheet characteristic information corresponding to at least one of the basis weight, the moisture percentage, the sheet thickness, or the size of the sheet. Thus, the sheet characteristic information of the sheet being conveyed on the first conveyance path is detected. In particular, the sheet characteristic information is detected by the first detector while the sheet is being conveyed on the first conveyance path is conveyed at the normal conveyance speed without stopping. Therefore, the sheet characteristic information of the sheet is continuously detected without reducing productivity. When a sheet (inappropriate sheet) of which sheet characteristic information is outside the predetermined range is mixed, the sheet is conveyed to the second conveyance path which is a purge path, and thus it is possible to eject the sheet without passing through the image former. Since the second detector is disposed on the second conveyance path which is a purge path that does not pass through the image former, the image former is not affected by sheet charging or the like due to detection by the second detector. Therefore, the reliability of an image forming operation of image formation is not degraded.

The configurations of the sheet characteristic detection device 30 and the image forming system 1000 including the sheet characteristic detection device 30 described above are merely main configurations for describing the features of the embodiments described above, and are not limited to the configurations described above, and can be modified in various manners within the scope of the claims. In addition, a configuration included in a general image forming apparatus is not excluded.

In the above embodiments, an example has been described in which the first detector includes four sensors, namely, the size sensor, the sheet thickness sensor, the basis weight sensor, and the moisture percentage sensor. However, this example is not restrictive, and the first detector is only required to include at least one sensor instead of a11 of the four sensors. Furthermore, in the first detector, at least one sensor may be disposed downstream of the branch portion on the first conveyance path. Similarly, in the above embodiments, an example has been described in which the second detector includes the stiffness sensor, the surface property sensor, and the resistance sensor. However, this example is not restrictive, and the second detector is only required to include at least one of the three sensors rather than all of the three sensors.

Furthermore, means and methods of performing various kinds of processing in the sheet characteristic detection device 30 and the image forming system 1000 according to the above embodiments can be implemented by any of a dedicated hardware circuit or a programmed computer. The program may be provided by, for example, a computer-readable recording medium such as a USB memory or a digital versatile disc (DVD)-ROM, or may be provided online via a network such as the Internet. In this case, the program recorded in the computer-readable recording medium is normally transferred to and stored in a storage such as a hard disk. In addition, the program may be provided as independent application software or may be incorporated into software of the apparatus as one function of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. A sheet characteristic detection device comprising:
a first conveyance path on which a sheet is conveyed;
a second conveyance path that is branched from the first conveyance path and on which a sheet to be purged is conveyed without passing through an image former; and
a second detector that is disposed on the second conveyance path and allows detection of a sheet characteristic.

2. The sheet characteristic detection device according to claim 1, wherein the second detector allows detection of sheet characteristic information corresponding to at least one of a stiffness, and a resistance of the sheet.

3. The sheet characteristic detection device according to claim 2, further comprising a first detector disposed on the first conveyance path, wherein the first detector detects the sheet characteristic while the sheet is being conveyed.

4. The sheet characteristic detection device according to claim 2, further comprising a first detector disposed on the first conveyance path, wherein the first detector detects the sheet characteristic corresponding to at least one of a type of the sheet or a change in a state of the sheet.

5. The sheet characteristic detection device according to claim 2, further comprising a first detector disposed on the first conveyance path, wherein the first detector includes at least one of a size sensor, a sheet thickness sensor, a basis weight sensor, or a moisture amount sensor that allows detection of the sheet characteristic corresponding to the size, the sheet thickness, the basis weight, or the moisture amount, respectively.

6. The sheet characteristic detection device according to claim 5, wherein the first detector includes the moisture amount sensor.

7. The sheet characteristic detection device according to claim 5, wherein
the first detector includes the sheet thickness sensor, the basis weight sensor, and the moisture amount sensor, and
the basis weight sensor and the moisture amount sensor are disposed downstream of the sheet thickness sensor on the first conveyance path.

8. The sheet characteristic detection device according to claim 5, wherein
the first detector includes the moisture amount sensor and the basis weight sensor, and
the moisture amount sensor and the basis weight sensor are disposed at a same position in a conveyance direction and at different positions in a width direction orthogonal to the conveyance direction on the first conveyance path.

9. The sheet characteristic detection device according to claim 5, wherein
the first detector includes the size sensor and another sensor corresponding to another sheet characteristic different from the size, and
the size sensor is disposed upstream of the another sensor on the first conveyance path.

10. The sheet characteristic detection device according to claim 5, wherein the size sensor is an image sensor, and allows detection of the size of the sheet in the conveyance direction and the width direction from read image data obtained by reading the sheet being conveyed.

11. The sheet characteristic detection device according to claim 5, wherein
the first detector includes the moisture amount sensor, and
the moisture amount sensor includes a light emitter that comprises a first emitter and a second emitter that each irradiate the front surface of the sheet with a light having a predetermined wavelength, and a light receiver that receives a light reflected when the front surface of the sheet reflects the light having the predetermined wavelength.

12. The sheet characteristic detection device according to claim 1, wherein the second detector detects the sheet characteristic while stopping the sheet conveyed on the second conveyance path, or detects the sheet characteristic while conveying the sheet at a lower conveyance speed than a conveyance speed on the first conveyance path.

13. The sheet characteristic detection device according to claim 1, wherein the second detector includes at least one of a stiffness sensor, a surface property sensor, or a resistance sensor that allows detection of sheet characteristic information corresponding to a stiffness, a surface property, or a resistance of the sheet, respectively, and the at least one of the sensors of the second detector detects the sheet characteristic information while stopping the sheet conveyed on the second conveyance path.

14. The sheet characteristic detection device according to claim 13, wherein the second detector includes the resistance sensor and at least one of the stiffness sensor or the surface property sensor, and the at least one of the stiffness sensor or the surface property sensor is disposed upstream of the resistance sensor on the second conveyance path.

15. The sheet characteristic detection device according to claim 13, wherein the second detector includes the stiffness sensor and the surface property sensor, and the stiffness sensor is disposed upstream of the surface property sensor on the second conveyance path.

16. The sheet characteristic detection device according to claim 13, wherein the second detector includes the stiffness sensor, and the stiffness sensor includes a presser that is disposed on the second conveyance path extending vertically upward and presses, from a lateral direction, a trailing end that is a free end of the sheet being stopped, the stiffness sensor including a pressure detector that detects a pressing force of the presser against the sheet.

17. The sheet characteristic detection device according to claim 13, wherein the second detector includes the resistance sensor, the resistance sensor includes a pair of rollers that abut against a front surface and a back surface of the sheet, respectively, and the resistance sensor measures the resistance of the sheet by applying a voltage between the pair of rollers and measuring a current that flows between the pair of rollers.

18. The sheet characteristic detection device according to claim 1, wherein a moisture amount sensor that detects sheet characteristic information corresponding to the moisture amount of the sheet and a resistance sensor that detects sheet characteristic information corresponding to the resistance of the sheet are disposed on at least one of the first conveyance path or the second conveyance path, and the moisture amount sensor is disposed upstream of the resistance sensor.

19. The sheet characteristic detection device according to claim 1, wherein the first conveyance path is a conveyance path connected to the image former.

20. An image forming system comprising:

the sheet characteristic detection device according to claim 1; and an image forming apparatus including the image former, wherein the image forming apparatus is disposed downstream of the first conveyance path.

21. The sheet characteristic detection device according to claim 1, wherein the second detector detects the sheet characteristic by applying a pressing force or a voltage to the sheet.

22. The sheet characteristic detection device according to claim 1, further comprising a first detector that is disposed on the first conveyance path and allows detection of sheet characteristic information corresponding to at least one of a size, a sheet thickness, a basis weight, or a moisture amount of the sheet.

* * * * *